(No Model.)
G. S. & J. M. BOWLING.
LIFTING JACK.
No. 320,214. Patented June 16, 1885.
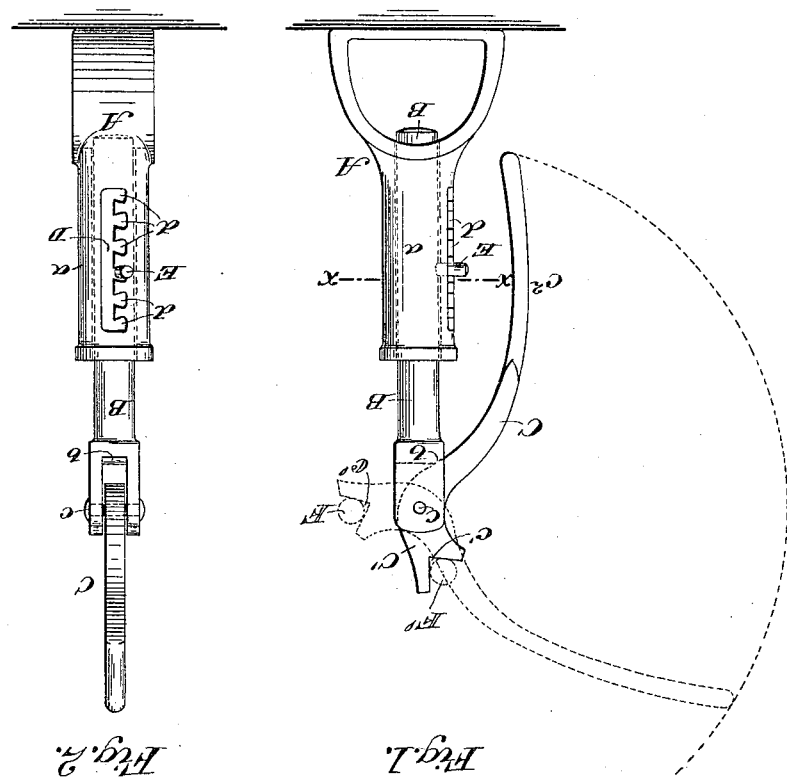
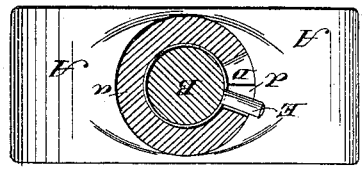
WITNESSES:
INVENTOR:
G. S. Bowling
J. M. Bowling
BY Munn & [Co]
ATTORNEYS.

United States Patent Office.

GEORGE S. BOWLING AND JAMES M. BOWLING, OF CLARKSVILLE, TENN.

LIFTING-JACK.

SPECIFICATION forming part of Letters Patent No. 320,214, dated June 16, 1885.

Application filed May 8, 1885. (No model.)

*To all whom it may concern:*

Be it known that we, GEORGE S. BOWLING and JAMES M. BOWLING, both of Clarksville, in the county of Montgomery and State of Tennessee, have invented certain new and useful Improvements in Lifting-Jacks, of which the following is a full, clear, and exact description.

Our invention relates to lifting-jacks adapted more especially for raising the axles of vehicles, to permit greasing the axle or repair of the wheel or other part of the vehicle, and has for its object to promote the efficiency and lessen the cost of this class of implements.

The invention consists in a lifting-jack made with a base having a notched slot and a post fitted to slide and turn in the base, and having a pin entering the notched slot and adapted to catch in the notches of the slot, and with a lifting-lever pivoted to the post and provided with a notch to engage the axle or other object to be lifted, all as hereinafter fully described and claimed.

Reference is to be had to the accompanying drawings, forming part of this specification, in which similar letters of reference indicate corresponding parts in all the figures.

Figure 1 is a side elevation of our improved lifting-jack with the operation of the lever indicated in dotted and full lines. Fig. 2 is an elevation of the jack at right angles to the position shown in Fig. 1, and with the lever raised; and Fig. 3 is a plan view in horizontal section on the line $x\ x$, Fig. 1.

The letter A indicates the base or stand of the lifting-jack, which base has a tubular upper part, $a$, in which is fitted to slide freely the post or bar B, to the forked head of which is pivoted on a strong pin, $c$, the lifting-lever C of the jack. The tubular part $a$ of base A has a slot, D, along one side, and along one side of the slot teeth or prongs project into it, so as to form a series of notches, $d$, into any one of which notches a pin, E, fixed in the side of the post B, is passed, to support the post-head and short arm or head C' of the lever C at the required height, according to the height of the axle to be lifted. The arm or head C' of the lever C has an angular notch, $c'$, formed in it, and the long arm or handle $c^2$ of the lever is so shaped relatively to its short arm C' and the pivot-pin $c$ that when the lever-arm $c^2$ is fully brought down the lifting-notch $c'$ of the lever will be swung beyond or forward of a vertical line drawn through the pivot, so that the load lifted will lock the lever in this position, the lever then resting at $b$ on the head of the post.

To adjust the lever C so its notch $c'$ stands at the required height, it only is necessary to turn the bar B axially to disengage its pin E from any one of the notches $d$ and then raise the bar until its pin E—now sliding in the straight part of slot D—is opposite the proper notch $d$, into which the pin then is set by turning the post. The lever C is set with its notch $c'$ under the axle to be lifted, as seen in dotted lines at F, Fig. 1, and when the arm $c^2$ of the lever is lowered the axle will be raised, as at F', and the lever will be locked in position, as before described, so that the jack will stand firmly to support the load.

It is evident that by the construction described the jack-head may almost instantly be set properly for action on vehicle-axles of any ordinary height, and that the leverage of the lever C remains the same in every case, so that the full power of the lever is available in raising the highest as well as the lowest axles.

The jack has very few parts, and none that are liable to get out of order, and it is very light, its total weight being about six pounds; so it is not cumbersome, and may conveniently be carried in a vehicle, so as to be at hand for use in emergencies.

The jack, although specially adapted to lifting vehicle-axles, may of course be used for many other purposes.

Having thus described our invention, what we claim as new, and desire to secure by Letters Patent, is—

1. A lifting-jack comprising a base, A, having a notched slot, D $d$, a post, B, fitted to slide and turn in the base, and having a pin, E, entering slot D and adapted to its notches $d$, and a lever, C, pivoted to post B and provided with a notch, $c'$, substantially as herein set forth.

2. The combination, in a lifting-jack, of the base A, having a notched slot, D $d$, a post, B, fitted to slide and turn in the base, and having a pin, E, entering slot D and adapted to its notches $d$, and a lever, C, pivoted at $c$ to post B, and provided with a notch, $c'$, located to swing beyond a vertical line drawn through the lever-pivot when the lever is fully down, substantially as herein set forth.

GEORGE S. BOWLING.
JAMES M. BOWLING.

Witnesses:
W. A. SHELBY,
ED T. LUCAS.